United States Patent [19]

Honda

[11] Patent Number: 4,575,752

[45] Date of Patent: Mar. 11, 1986

[54] DIAGNOSTIC X-RAY APPARATUS HAVING A MASTER TIMING CONTROL UNIT

[76] Inventor: Michitaka Honda, 1376-1 Shimoishigami, Otawara-shi, Tochigi-ken, Japan

[21] Appl. No.: 502,951

[22] Filed: Jun. 10, 1983

[30] Foreign Application Priority Data

Jun. 17, 1982 [JP] Japan .................. 57-103027

[51] Int. Cl.⁴ .............................................. H04N 5/32
[52] U.S. Cl. ..................... 358/111; 358/150; 378/99
[58] Field of Search ............... 358/111, 148, 149, 150, 358/153; 378/99; 128/653, 654, 655; 364/414; 328/187

[56] References Cited

U.S. PATENT DOCUMENTS

| | | | |
|---|---|---|---|
| 4,204,225 | 5/1980 | Mistretta | 358/111 |
| 4,204,226 | 5/1980 | Mistretta | 358/111 |
| 4,285,063 | 8/1981 | Zbinden | 358/149 |
| 4,393,402 | 7/1983 | Keyes | 358/111 |
| 4,467,358 | 8/1984 | Switsen | 358/153 |

OTHER PUBLICATIONS

Nakashika et al., "Latest Diagnostic System for Circulatory Organs", Toshiba Review, International Edition, No. 43, Jul./Aug. 1969, pp. 24–29.

Primary Examiner—Howard W. Britton
Assistant Examiner—Victor R. Kostak
Attorney, Agent, or Firm—Finnegan, Henderson

[57] ABSTRACT

A diagnostic X-ray apparatus emitting X-ray radiation with a digital X-ray subtraction imaging technique which comprises digitization of video signals from an image intensifier-T.V. chain, digital subtraction and reconversion of the resulting digital difference video signals to analog signals under control of a master timing control unit. The master timing control unit comprises a clock for generating basic clock pulses supplied to a synchronizing delay circuit for generating a plurality of delayed clock pulses which are selected by a predetermined formula, and the resulting pulses are used to maintain the entire system in a proper phase relationship.

7 Claims, 3 Drawing Figures

DIAGNOSTIC X-RAY APPARATUS HAVING A MASTER TIMING CONTROL UNIT

BACKGROUND OF THE INVENTION

This invention relates to an improvement in diagnostic apparatus utilizing digital imaging techniques, synchronizing and timing circuits for such systems.

The digital X-ray subtraction imaging technique using an imaging intensifier-T.V. chain was developed and first described by Mistretta et al. For example, U.S. Pat. Nos. 4,204,225 and 4,204,226, issued to Charles A. Mistretta, disclose real-time digital X-ray subtraction imaging methods and apparatus which are used in the so-called digital radiography or digital fluoroscopy technology.

These digital X-ray subtraction imaging apparatus include an image intensifier, a T.V. camera whose output is converted into digital format, and an image processor incorporating two digital memories. As disclosed in U.S. Pat. No. 4,204,225, in carrying out the mask mode of this technology a first memory is preferably employed to integrate and store digital mask video signals by digitization of video signals from an image intensifier-T.V. chain during an initial mask time interval utilizing a relatively large number of television fields. A second memory system integrates ongoing digital video signals and provides an output of these integrated video signals, from which the mask video signals from the memory system are subtracted. The resulting digital difference video signals are supplied to a digital-to-analog converter which provides corresponding analog difference video signals for display by a display device. Alternatively, the resulting analog difference video signals may be fed to a multiformat camera for making a selected number of radiographic exposures on a single film.

In the time interval difference mode disclosed in U.S. Pat. No. 4,204,226, a series of difference images is produced by integrating digital video signals over a series of successive time intervals, performing a series of subtractions between the sets of successive integrated video signals stored in the memories to produce a series of digital difference video signals, and converting such digital difference video signals into visibly displayed difference images representing changes in the X-ray image during the successive time intervals.

One advantage of digital radiography apparatus is its capability to perform angiography by means of intravenous injection instead of intra-arterial catheter techniques with their higher risks.

Still another advantage of digital radiography apparatus is its capability to provide improved low contrast detectability, namely, to amplify subtle amounts of contrast media in arteries better than film methods can.

Another advantage of digital radiography apparatus employing pulsed X-rays is that significant loss of spatial resolution due to physiological motion can be prevented because the short radiation pulse for each image results in less loss of detail during fluoroscopy of moving objects.

These digital radiography apparatus include a master timing control circuit which provides synchronization, which circuit is connected to a slave timing control unit for controlling an associated memory unit. The T.V. camera operates in synchronization with the system, via the master timing control which generates sync and blanking signals for the camera video signals.

However, in the prior art systems, the master timing control unit comprises generally a single-phase control clock, so that synchronization errors arise between the sync signals produced by the video camera and a pixel clock via the master timing control circuit, which controls the memory unit for writing in the digital pixel signals. These synchronization errors casue misregistration, and the artifacts from the misregistration appear in the subtraction images. The artifacts from the misregistration are especially harmful when the contrast between picture elements is rather low. It is desirable, therefore, to maintain improved spatial resolution and low contrast detectability by removing or minimizing the synchronization errors.

SUMMARY OF THE INVENTION

The objects of the present invention are, therefore, to overcome the above defects in prior art digital radiography apparatus including a master timing control circuit, to provide subtraction images without the artifacts from misregistration due to synchronization errors, and to minimize significant misregistration due to synchronization errors.

Another object of the invention is to constrain synchronization errors between the horizontal synchronizing signals from the video camera and the synchronizing signals from the master timing control unit to acceptably low levels.

Another object of the invention is to provide a digital radiography apparatus for diagnostic X-ray apparatus in which the digital video signals may be integrated and stored by digitization of the desired video signals from an image intensifier-T.V. chain, and including an improved master timing control unit for providing all of the control, timing and synchronizing pulses and signals for the X-ray apparatus.

These and other objects are accomplished by a diagnostic X-ray apparatus for producing visible difference images from X-ray images obtained from X-ray radiation comprising an X-ray generating source for emitting X-ray radiation to produce an X-ray image, television means including television camera means for converting said X-ray image into series of television images comprising trains of analog video signals, an analog-to-digital interface means for converting said analog video signals into corresponding digital video signals, a digital memory system including at least two digital memory means for integrating and storing said digital video signals in a predetermined sequence, subtracting means for producing digital difference video signals by performing a subtraction between the recent digital video signals stored in said digital memory system and preceding digital video signals stored in said digital memory system, a digital-to-analog interface means for converting digital difference video signals into analog difference video signals, synchronizing means including means for generating a plurality of clock pulses in a predetermined time relationship and means for selecting one clock pulse out of said plurality of clock pulses according to a predetermined formula, and means responsive to said selected pulse for producing synchronizing signals for controlling the conversion of said analog-to-digital converter and digital-to-analog converter, the storing and integrating of said digital memory system, and the subtraction of said subtracting means, and a television display means for producing visible difference images corresponding to said analog difference video signals.

How the foregoing and other more specific objects of the invention are achieved will be evident in the following more detailed description of a preferred embodiment of the invention which will now be set forth in reference to the drawings.

DESCRIPTION OF A PREFERRED EMBODIMENT

Figure 1:
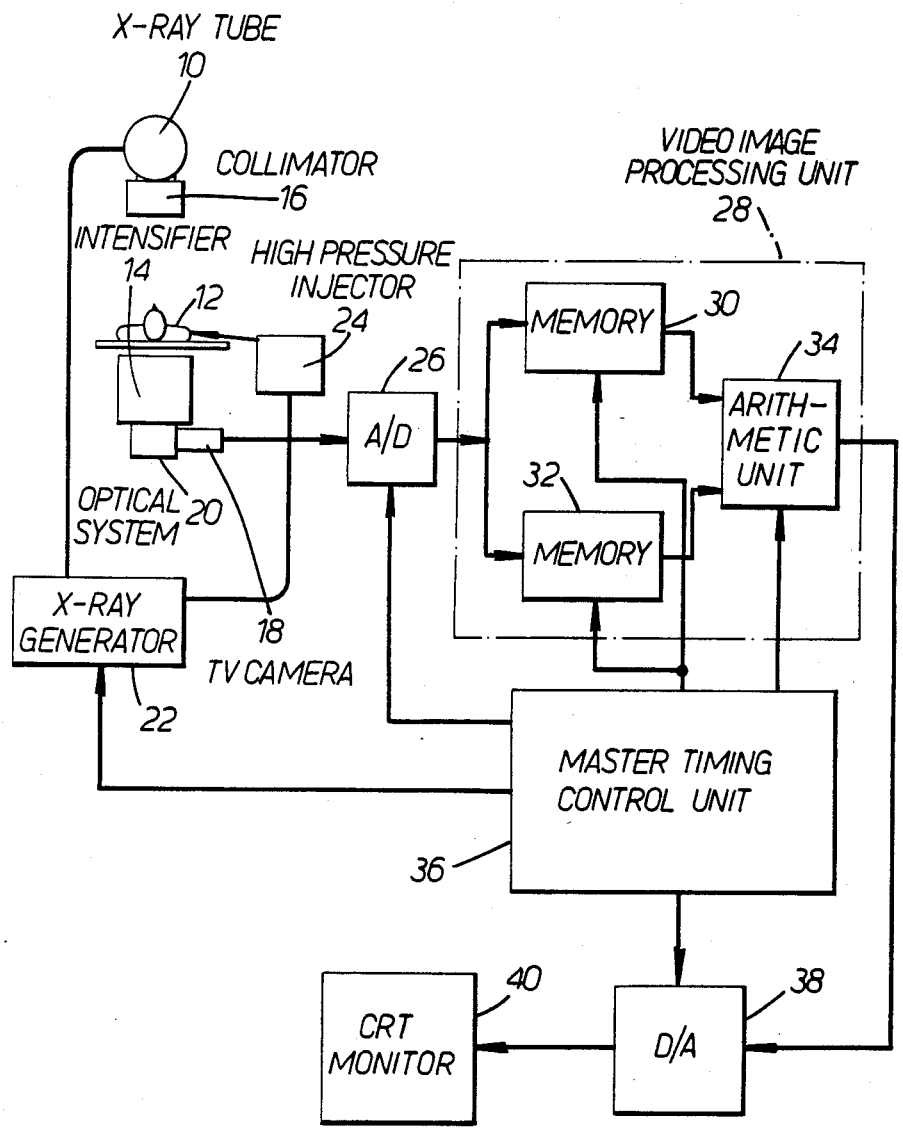
FIG. 1 is a block diagram of a preferred embodiment of a diagnostic X-ray apparatus using a digital X-ray subtraction imaging techniques in accordance with the present invention.

FIG. 1 is a block diagram of a preferred embodiment of a diagnostic X-ray apparatus using a digital X-ray subtraction imaging technique in accordance with the present invention.

As indicated earlier, diagnostic X-ray apparatus using real time digital processing of X-ray transmission often includes a conventional T.V. fluoroscopy system employing real time digital processing hardware.

An X-ray tube 10 having a conventional filament and an anode produces X-rays which impinge upon a patient 12, thus casting a shadow image of the patient on an input of an image intensifier tube 14. A servo-controlled collimator 16 along with a collimator servo system (not shown) disposed between the X-ray tube 10 and the patient is utilized to control the size of the X-ray beam emitted from the X-ray tube 10.

The intensifier 14 intensifies the X-ray image and produces a corresponding optical image on the output screen of the intensifier 14. This image is scanned by a T.V. camera 18, via a known optical system 20 including an object lens, a field lens (not shown) and auto iris (not shown) for adjusting the quantity of light from the intensifier 14, under control of a T.V. camera control unit (not shown) to produce corresponding video signals on an output of the T.V. camera 18.

An X-ray generator 22 serves to provide high voltage to energize the X-ray tube 10 under control of an X-ray control unit (not shown). The X-ray generator 22 is also interfaced to a master timing control unit that will be described in detail later so that X-ray tube 10 is pulsed on and off at regular intervals according to the need of the various imaging models.

Subtraction is a known technique that is used to remove overlying and underlying structures after the object of interest is enhanced by a contrast medium. Images are acquired before and after the contrast medium is present and these images are subtracted.

The contrast medium is preferably injected into the right basilic vein of the patient 12 using a high-pressure injector 24 synchronized with the operation of the X-ray generator 22. An analog-to-digital interface circuit 26 including a sync pulse stripper separates the vertical and horizontal synchronizing pulses from the video information provided from the camera 18 to provide video signals without the synchronizing pulses. These video signals are applied to a gate circuit and to an analog-to-digital converter for converting analog video signals provided at the output of the gate circuit into corresponding digital video signals. The master timing control unit 36 supplies clock and gating, or control, pulses to the analog-digital interface circuit 26.

The digital video output of the analog-to-digital interface circuit 26 is supplied to a video image processing unit 28. The video image processor 28 includes two memory systems 30, 32, for integrating and storing the digital video signals over a series of time intervals, and an arithmetic logic unit 34 for enabling the memories 30, 32 to integrate and store the digital video signals over the series of time intervals. The processor 28 also produces digital difference video signals by performing subtraction between the set of integrated digital video signals stored in the most recently filled memory system 32 and the set stored in the previously filled memory system 30 in response to timing signals initiated by the master timing control unit 36.

The digital difference video signals are supplied to a digital-to-analog interface circuit 38 which provides corresponding analog difference video signals for display by a CRT monitor 40.

Figure 2:
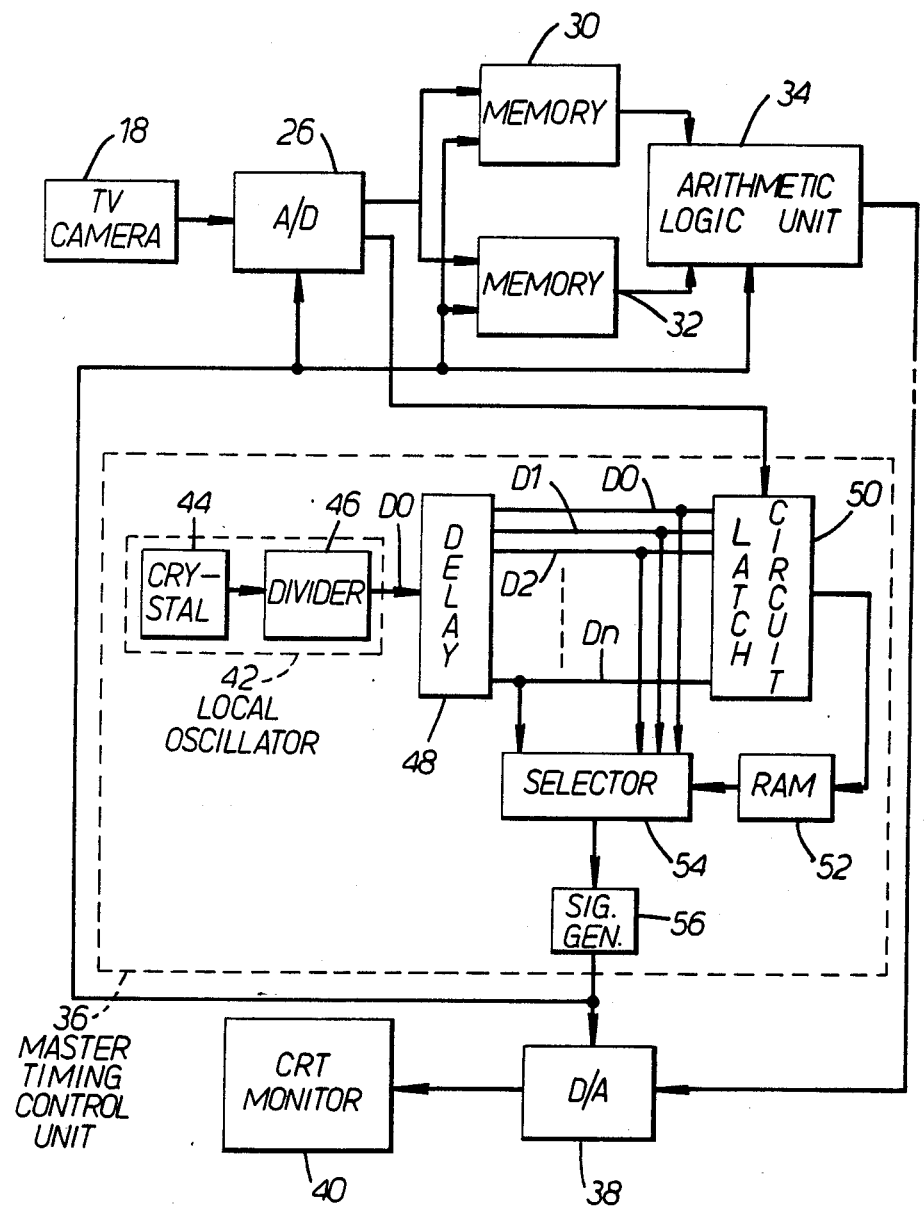
FIG. 2 is a detailed diagram of an example of the master timing control unit of FIG. 1.

FIG. 2 includes a detailed circuit diagram of the master control circuit 36 for providing all of the control, timing and synchronizing pulses and signals for the entire system.

In FIG. 2, the master timing control circuit 36 includes a local oscillator 42 for generating a basic clock at a frequency f1 which amounts to one clock pulse every T nanoseconds (ns), the clock comprising a crystal oscillator 44 and a divider 46 driven by the crystal oscillator.

This basic clock at the frequency f1 is applied to a delay circuit 48 which generates and applies to a latch circuit 50 a plurality of different clock pulses D1–Dn delayed by an amount T/n (n=integer more than two), with respect to the basic clock. For example, assuming T is 100 ns, n being 5, five different clock pulses delayed by 20 ns with respect to the basic clock are generated as shown in FIG. 3.

The different clock pulses D1–Dn from the delay circuit 48 are sampled by the latch circuit 50 in synchronism with the horizontal synchronizing signals from the analog-to-digital interface 26, and the sampled values are converted to quantified "1" and "0" signals. The quantified output data from the latch circuit 50 will be received by a random access memory 52, for later access, by addressing the memory 52 in a predetermined sequence. A logic flag indicative of the status of the latch is furnished to the random access memory 52. A selector 54 receives the different pulse trains D1–Dn from the delay circuit 48 and selects one of the different pulse trains in response to the logical read out of the memory 52. The output selected by the selector 54 is supplied to a synchronizing signal generator 56 which provides synchronizing signals to the digital-to-analog interface circuit 38 the A-to-D circuit 26, the memories 30 and 32, and the ALU 34. The digital difference video output from the arithmetic logic unit 34 is applied to the digital-to-analog interface circuit 38 in conjunction with the synchronizing pulses. The digital-to-analog interface circuit 38 includes a digital-to-analog converter for converting the composite video output from digital form into analog video signals, which are then supplied to the CRT monitor 40 for display.

Figure 3:
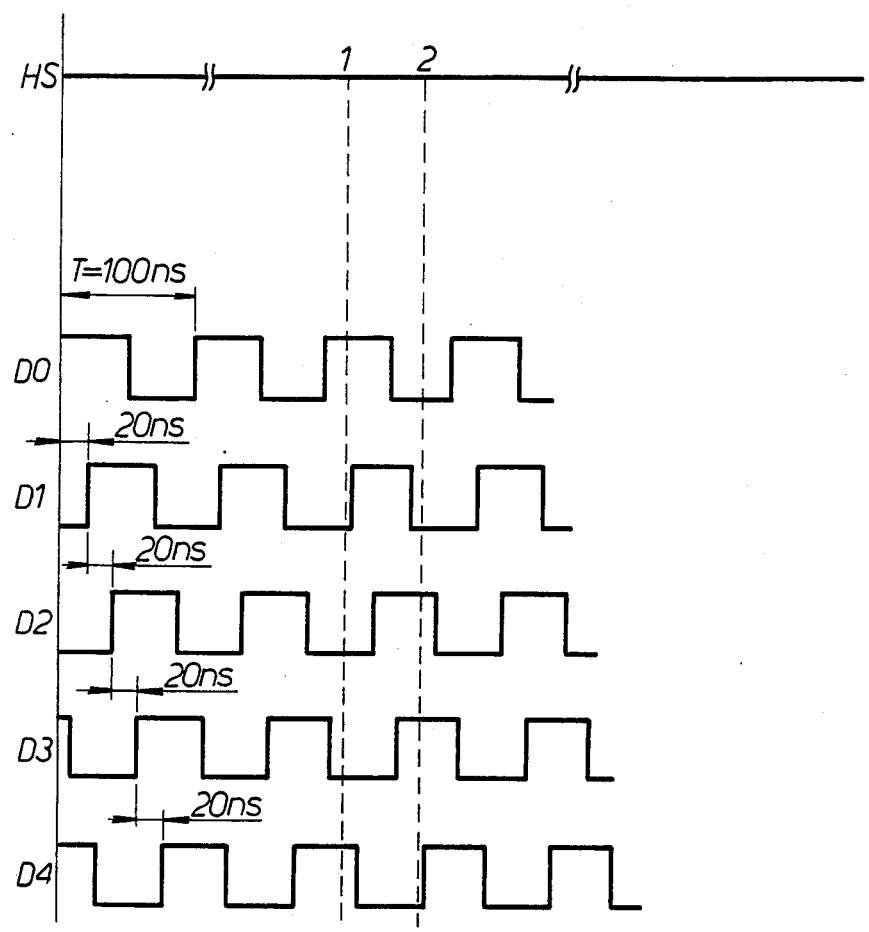
FIG. 3 is a time chart for explaining the operation of the timing control unit of FIG. 2.

The operation of the apparatus according to the present invention can be most easily understood by considering FIG. 2 in conjunction with FIG. 3.

As previously described, in the so-called mask mode method, a series of difference images is produced by developing a preinjection mask image, prior to the injection of the contrast medium, the electronically subtracting the mask image from each of a series of post-injection images. This mask subtraction mode results in the removal of effects due to soft tissue and bone or air-filled structures, so that the image elements due to the contrast medium are clearly visible in the subtracted images. An alternative method offered by the subtraction technique is the use of the time interval difference method, in which each set of integrated digital images is used as a mask for the following integrated digital image. The time interval difference method is particularly well adapted for visualizing the progress of a contrast medium injected into a peripheral portion of the cardiovascular system.

In order to digitize and store the information which serves as the mask or the subsequent series of images, the amplified analog video signals from the T.V. camera 18 are supplied to the A/D interface circuit 26 which gates the analog video signals, separates the horizontal and vertical sync pulses from the gated analog signals, and digitizes the gated signals in the analog-to-digital converter periodically, as determined by the synchronizing clock pulses from the synchronizing clock pulse generator 56. The A/D interface circuit 26 applies corresponding digital video signals to the mask producing memory system 30 where a first image serving as the mask for the subtraction is made before the contrast medium injection, and also to the second memory system 32 storing the post-injection image.

Alternately, the mask image in the first memory system 30 is subtracted by the arithmetic logic unit 34 from the integrated subsequent video signals from the second memory system 32. The digital difference video signals of the subtracted result are supplied from the arithmetic logic unit 34 to the D/A interface circuit 38. The first memory system 30, the second memory system 32, and the arithmetic logic unit 34 are in synchronization with the synchronizing clock pulses generated by the synchronizing clock pulse generator 56.

The synchronizing clock generator 56 generates the synchronizing clock pulses in response to the output of the selector 54 which selects one of the different pulse trains D0–D4 in proper phase with the horizontal synchronizing pulses separated by the stripper of the A/D interface circuit 26.

The selector 54 operates in response to stored data representing the several synchronizing pulse trains in accordance with a predetermined formula in conjunction with the latch status. The pulse train D0 and the delayed pulse trains D1–D4 are transmitted in parallel to the latch 50 which generates an address bit sequence used for reading data from the random access memory 52 coincident with occurrence of the horizontal sync pulses.

Although a random access memory as been specified, other forms of memory may be used as known in the art. Conversions of the RAM 52 are set forth in Table I:

TABLE I

| Output of RAM 52 Selected | Latch Status | | | | |
|---|---|---|---|---|---|
| | D0 | D1 | D2 | D3 | D4 |
| D0 | 1 | 0 | 0 | 1 | 1 |
| D1 | 1 | 0 | 0 | 0 | 1 |
| D1 | 1 | 1 | 0 | 0 | 1 |
| D2 | 1 | 1 | 0 | 0 | 0 |
| D2 | 1 | 1 | 1 | 0 | 0 |
| D3 | 0 | 1 | 1 | 0 | 0 |
| D3 | 0 | 1 | 1 | 1 | 0 |
| D4 | 0 | 0 | 1 | 1 | 0 |
| D4 | 0 | 0 | 1 | 1 | 1 |
| D0 | 0 | 0 | 0 | 1 | 1 |

The synchronizing clock pulse trains used for keeping the entire system in a proper phase relationship are these established by the basic pulse train D0 before occurrence of the first horizontal sync pulse separated by the A/D interface circuit 26.

Horizontal sync pulses separated in the A/D interface circuit 26 are supplied repeatedly as, for instance, every 63.5 microseconds, shown by the waveform which is labelled H S in FIG. 3.

In FIG. 3, the different delayed clock pulses which are marked D1–D4 are delayed by 20 ns with respect to the basic clock D0. If the state of latch 50 is sampled in response to the horizontal sync pulse occurring as indicated at 1 in line HS of FIG. 3, the status of the latch 50 represents the bit sequence 1, 0, 0, 0, 1 corresponding to the presence of the delayed pulses. The signal read out of the RAM 52 by this latch state represents the delayed pulse train D1 in accordance with the TABLE I. This "D1" output is supplied to the selector 54 and the latter responds by supplying the D1 pulse train to the output of signal generator 56. Thus, the delayed pulse train D1 is used to provide the synchronizing clock pulses instead of the basic pulse train D0. On occurrence of the next horizontal sync pulse marked 2 in line HS of FIG. 3, the status of the latch 50 represents 0, 0, 1, 1, 0 and the output "D4" is read from RAM 52 in accordance with TABLE I and is supplied to the selector 54. This selects the delayed pulse train D4 for supplying the synchronizing clock pulses replacing the delayed pulse train D1. The bit sequences shown in Table I represent the signal transitions embodied in the pulse trains D0–D4. The 1-bit at the top of the "D0" column represents a positive-going (+) transition in the D0 pulse train. The 1-bit appearing in the third row in the "D1" column indicates a + transition in the D1 pulse train. The 1-bit in row five of the "D2" column indicates a + transition in the D2 pulse train. Positive-going transitions in the D3 and D4 pulse trains are represented by the 1-bits appearing in rows seven and nine of the "D3" and "D4" columns, respectively. The status of latch 50 at any given instant thus indicates the pulse train which bears the closest synchronization to the video sync pulse which samples the latch output and feeds it to the address inputs of RAM 52. Thus a latch output of 11000 indicates that pulse train D2 is about to go positive while an output of 11100 indicates that D2 has just gone positive. As shown in Table I, data representing "D2" is read out of RAM 52 in response to the 11000 and 11100 address sequences. Output data representing "D0," "D1," "D3" and "D4" are read out in response to the other address inputs shown in Table I. Accordingly, the bit patterns occurring at the output of latch 50 represent the timing of the signal transitions of pulse trains D0–D4 according to the predetermined formula shown in Table I.

This enables the synchronizing clock pulses for the entire system to be selected in a proper phase relationship out of a plurality of delayed clock pulses coincident with occurrence of the horizontal sync pulses coming from the A/D interface circuit 26.

All the information representative of the delayed pulses established by the predetermined formula corresponding to $2^n$ (n=an integer more than two) status of the latch 50 is stored in the RAM 52.

Generally, any number n of delayed clock pulses, as required should be obtainable by those skilled in the art.

Although the present invention has been described with a certain degree of particularity, it should be understood that the present disclosure has been made only by way of example, and that numerous changes in the detail of construction, and the combination arrangement of parts, elements and components can be resorted to without departing from the spirit and scope of the present invention.

What is claimed is:

1. Apparatus for generating an output timing signal synchronized with a video signal including repetitively occurring sync pulses comprising in combination:

timing means for generating a plurality of pulse trains offset in phase from one another;
   digital signal generating means producing at its output a sequence of digital control signals containing data indicative of the timing of the signal transitions occurring in said pulse trains;
   output means for selecting one of said pulse trains and supplying it as said output timing signal; and
   control means including sampling means responsive to said video signal for controlling said output means to select one of said pulse trains in response to the data contained in a digital control signal which is selected by said sampling means, the latter operating to select said digital control signal in response to detection of a sync pulse in said video signal.

2. The apparatus set forth in claim 1 wherein said control means comprises:

conversion means for converting each selected digital control signal into a selection signal representing a predetermined one of said pulse trains.

3. The apparatus set forth in claim 2 wherein said conversion means comprises:

memory means storing data representing each of said pulse trains;
   means for addressing said memory means with said selected digital control signal to read out of said memory means output data which provides said selection signal, the latter being supplied to said output means to control the selection of one of said pulse trains.

4. Diagnostic X-ray apparatus for producing visible images of a subject comprising:

an X-ray generating source for emitting X-ray radiation to produce an X-ray image;
   television means including television camera means for converting said X-ray image into a television image comprising trains of analog video signals;
   an analog-to-digital interface means for converting said analog video signals into corresponding digital video signals;
   means for processing said digital video signals to form modified digital video signals representing a modified image;
   digital-to-analog interface means for converting said modified digital video signals into modified analog video signals;
   synchronizing means including means for generating a plurality of pulse trains in a predetermined time relationship and means for selecting one of said pulse trains according to a predetermined formula in response to sync pulse data in said video signals, and means responsive to said selected pulse train for producing synchronizing signals for controlling the operation of said system including said analog-to-digital converter and digital-to-analog converter; and
   television display means for producing a visible image corresponding to said modified analog difference video signals.

5. The apparatus of claim 4 wherein said means for generating a plurality of pulse trains includes:

local oscillator means generating a basic pulse train at a predetermined rate; and
   delay line means comprising delay elements coupled to said local oscillator means, and operative to delay said incoming basic pulse train by predetermined amounts to generate a plurality of pulse trains.

6. The apparatus of claim 5 wherein said analog-to-digital interface means further includes:

a stripper for separating vertical and horizontal synchronizing signals from said analog video signals of said television means.

7. The apparatus of claim 6 wherein said means for selecting one pulse train out of said plurality of pulse trains is operative to produce timing signals synchronized with the horizontal synchronizing signals from said stripper; and said means for selecting includes latch means connected to said delay line means for generating logic signals representing the status of synchronism of said plurality of pulse trains with said horizontal synchronizing signals, and means for generating signals representing a pulse train selected responsive to said logic signals.

* * * * *